(12) United States Patent
Oshima et al.

(10) Patent No.: US 10,933,578 B2
(45) Date of Patent: Mar. 2, 2021

(54) PATTERN FORMING SHEET, PATTERN MANUFACTURING APPARATUS, AND PATTERN MANUFACTURING METHOD

(71) Applicant: KANTATSU CO., LTD., Yaita (JP)

(72) Inventors: Eiji Oshima, Tochigi (JP); Kazutaka Noborimoto, Tokyo (JP)

(73) Assignee: KANTATSU CO., LTD., Tochigi (JP)

( * ) Notice: Subject to any disclaimer, the term of this patent is extended or adjusted under 35 U.S.C. 154(b) by 266 days.

(21) Appl. No.: 15/873,696

(22) Filed: Jan. 17, 2018

(65) Prior Publication Data

US 2018/0297274 A1     Oct. 18, 2018

(30) Foreign Application Priority Data

Apr. 17, 2017   (JP) .............................. JP2017-081401

(51) Int. Cl.
| | | |
|---|---|---|
| *B29C 64/129* | (2017.01) | |
| *B29C 64/20* | (2017.01) | |
| *B29C 64/223* | (2017.01) | |
| *B33Y 30/00* | (2015.01) | |
| *B33Y 10/00* | (2015.01) | |
| *B33Y 40/00* | (2020.01) | |

(52) U.S. Cl.
CPC ............ *B29C 64/129* (2017.08); *B29C 64/20* (2017.08); *B29C 64/223* (2017.08); *B33Y 10/00* (2014.12); *B33Y 30/00* (2014.12); *B33Y 40/00* (2014.12)

(58) Field of Classification Search
CPC ...................... H05K 2203/0528; H05K 3/0008
See application file for complete search history.

(56) References Cited

U.S. PATENT DOCUMENTS

| | | | |
|---|---|---|---|
| 3,891,441 A | 6/1975 | Tsuji et al. | |
| 4,304,839 A | 12/1981 | Cohen et al. | |
| 4,575,233 A * | 3/1986 | Copeland | ............... G03B 27/04 |
| | | | 355/85 |
| 5,679,268 A | 10/1997 | Takahashi et al. | |

(Continued)

FOREIGN PATENT DOCUMENTS

| | | |
|---|---|---|
| CN | 103261302 A | 8/2013 |
| CN | 107660033 A | 2/2018 |

(Continued)

OTHER PUBLICATIONS

Office Action issues in co-pending U.S. Appl. No. 15/681,720, dated Sep, 20, 2018.

(Continued)

*Primary Examiner* — Jacob T Minskey
*Assistant Examiner* — Virak Nguon
(74) *Attorney, Agent, or Firm* — Hamre, Schumann, Mueller & Larson, P.C.

(57) ABSTRACT

An object of this invention to perform positioning between the obverse surface and the reverse surface of a sheet and shape a pattern on each of the two surfaces of the sheet. A pattern manufacturing apparatus includes a shaping base, a light beam irradiation window, an optical engine, a lifting head, a head feed mechanism, and a stepping motor. A pattern forming sheet is a sheet in which an admixture containing a conductive material and a photo-curing resin is applied to both of the obverse surface and the reverse surface. The pattern forming sheet is provided with at least one positioning reference hole.

17 Claims, 14 Drawing Sheets

(56) References Cited

U.S. PATENT DOCUMENTS

| | | | | |
|---|---|---|---|---|
| 6,198,525 | B1 * | 3/2001 | Barringer | G03B 27/32 |
| | | | | 355/23 |
| 6,299,572 | B1 * | 10/2001 | Harari | G03F 9/00 |
| | | | | 101/485 |
| 6,747,217 | B1 * | 6/2004 | Jochym | H01R 12/58 |
| | | | | 174/265 |
| 8,080,350 | B2 | 12/2011 | Banba et al. | |
| 2003/0214571 | A1 | 11/2003 | Ishikawa et al. | |
| 2003/0215574 | A1 | 11/2003 | Ishino | |
| 2004/0223129 | A1 | 11/2004 | Ishikawa et al. | |
| 2005/0037281 | A1 | 2/2005 | Sato et al. | |
| 2005/0253922 | A1 | 11/2005 | Hashiguchi | |
| 2006/0215138 | A1 | 9/2006 | Liu | |
| 2006/0269217 | A1 | 11/2006 | Shirota et al. | |
| 2009/0086009 | A1 * | 4/2009 | Naito | G03F 9/00 |
| | | | | 347/225 |
| 2009/0090004 | A1 * | 4/2009 | Kubota | H05K 1/111 |
| | | | | 29/852 |
| 2009/0091730 | A1 | 4/2009 | Tanaka | |
| 2009/0173723 | A1 | 7/2009 | Nakagawa et al. | |
| 2009/0286173 | A1 | 11/2009 | Ushirokawa et al. | |
| 2012/0262686 | A1 * | 10/2012 | Laidig | G03F 7/70258 |
| | | | | 355/53 |
| 2013/0285366 | A1 | 10/2013 | Tailor et al. | |
| 2013/0288002 | A1 | 10/2013 | Hwang et al. | |
| 2013/0292862 | A1 | 11/2013 | Joyce | |
| 2013/0308111 | A1 | 11/2013 | Lee et al. | |
| 2013/0314683 | A1 | 11/2013 | Watanabe et al. | |
| 2015/0182997 | A1 | 7/2015 | Balantrapu et al. | |
| 2015/0223320 | A1 | 8/2015 | Gerhäußer | |
| 2017/0196130 | A1 * | 7/2017 | Wang | H05K 13/0069 |
| 2017/0232669 | A1 | 8/2017 | Watanabe et al. | |
| 2018/0087897 | A1 | 3/2018 | Oshima et al. | |
| 2018/0088471 | A1 | 3/2018 | Oshima et al. | |
| 2018/0139849 | A1 | 5/2018 | Oshima et al. | |
| 2018/0222108 | A1 | 8/2018 | Oshima et al. | |

FOREIGN PATENT DOCUMENTS

| | | | | |
|---|---|---|---|---|
| EP | 0184820 | A2 * | 6/1986 | H03K 3/0008 |
| JP | H0897600 | A * | 4/1996 | |
| JP | 2000-238137 | A | 9/2000 | |
| JP | 2003-039564 | A | 2/2003 | |
| JP | 2004-022623 | A | 1/2004 | |
| JP | 2004-128418 | A | 4/2004 | |
| JP | 2004-281738 | A | 10/2004 | |
| JP | 2006-319138 | A | 11/2006 | |
| JP | 2006319138 | A * | 11/2006 | |
| JP | 2012-014015 | A | 1/2012 | |
| JP | 2012-119410 | A | 6/2012 | |
| JP | 2012-194253 | A | 10/2012 | |
| JP | 2013-67016 | A | 4/2013 | |
| JP | 2013-075389 | A | 4/2013 | |
| JP | 2013-235202 | A | 11/2013 | |
| JP | 2014-192275 | A | 10/2014 | |
| JP | 2017-203199 | A | 11/2017 | |
| WO | 08-230048 | A | 9/1996 | |

OTHER PUBLICATIONS

Office Action issued in co-pending U.S. Appl. No. 15/681,217, dated Oct. 22, 2018.
Co-pending U.S. Appl. No. 16/146,696, filed Sep. 28, 2018.
Co-pending U.S. Appl. No. 16/146,780, filed Sep. 28, 2018.
Co-pending U.S. Appl. No. 16/146,851, filed Sep. 28, 2018.
Office Action issued in co-pending U.S. Appl. No. 15/569,058, dated Nov. 5, 2018.
Office Action for Japanese Patent Application No. 2015-116660, dated Aug. 21, 2018.
Report of Reconsideration by Examiner Before Appeal, issued in Japanese Patent Application No. 2015-116660, dated Dec. 13, 2018.
Office Action issued in co-pending U.S. Appl. No. 15/569,070, dated Oct. 25, 2018.
International Search Report for PCT/JP2016/065642, dated Jul. 12, 2016.
International Search Report for PCT/JP2016/066225, dated Aug. 16, 2016.
Office Action issued in Chinese Application No. 201721112419.1, dated Feb. 13, 2018.
Co-pending U.S. Appl. No. 15/569,058, filed Oct. 24, 2017.
Co-pending U.S. Appl. No. 15/569,070, filed Oct. 24, 2017.
Office Action issued in U.S. Appl. No. 15/681,217, dated Apr. 18, 2018.
Office Action issued in U.S. Appl. No. 15/569,070, dated Apr. 17, 2018.
Office Action issued in Chinese Application No. 201721112370.X, dated Apr. 28, 2018.
Office Action issued in co-pending U.S. Appl. No. 15/681,217, dated Feb. 6, 2019.
Office Action issued in co-pending U.S. Appl. No. 15/681,720, dated Apr. 1, 2019.
Office Action issued in co-pending U.S. Appl. No. 15/569,058, dated Mar. 5, 2019.
Co-pending U.S. Appl. No. 16/375,749, filed Apr. 4, 2019.
Co-pending U.S. Appl. No. 16/386,080, filed Apr. 16, 2019.

* cited by examiner

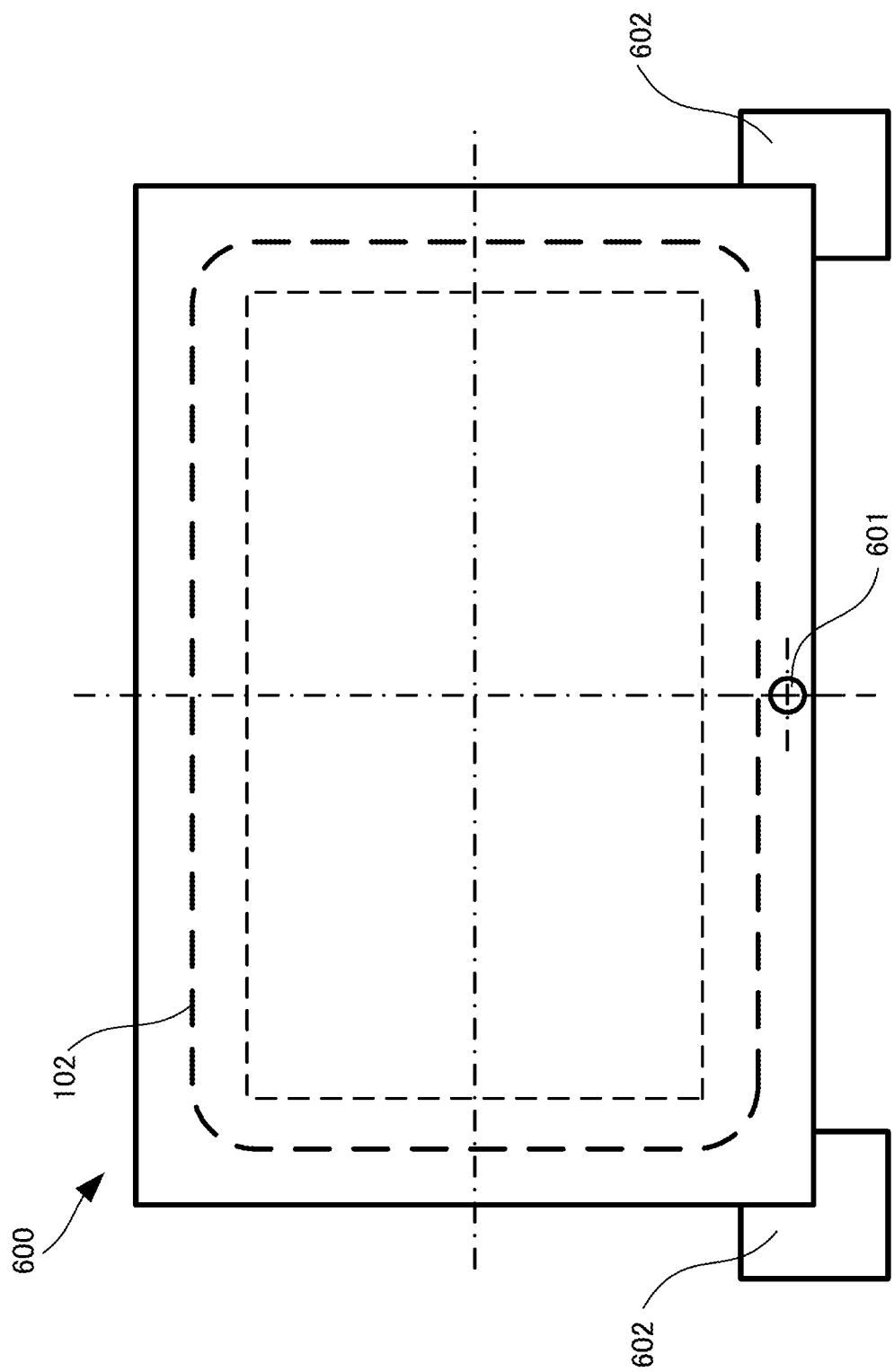

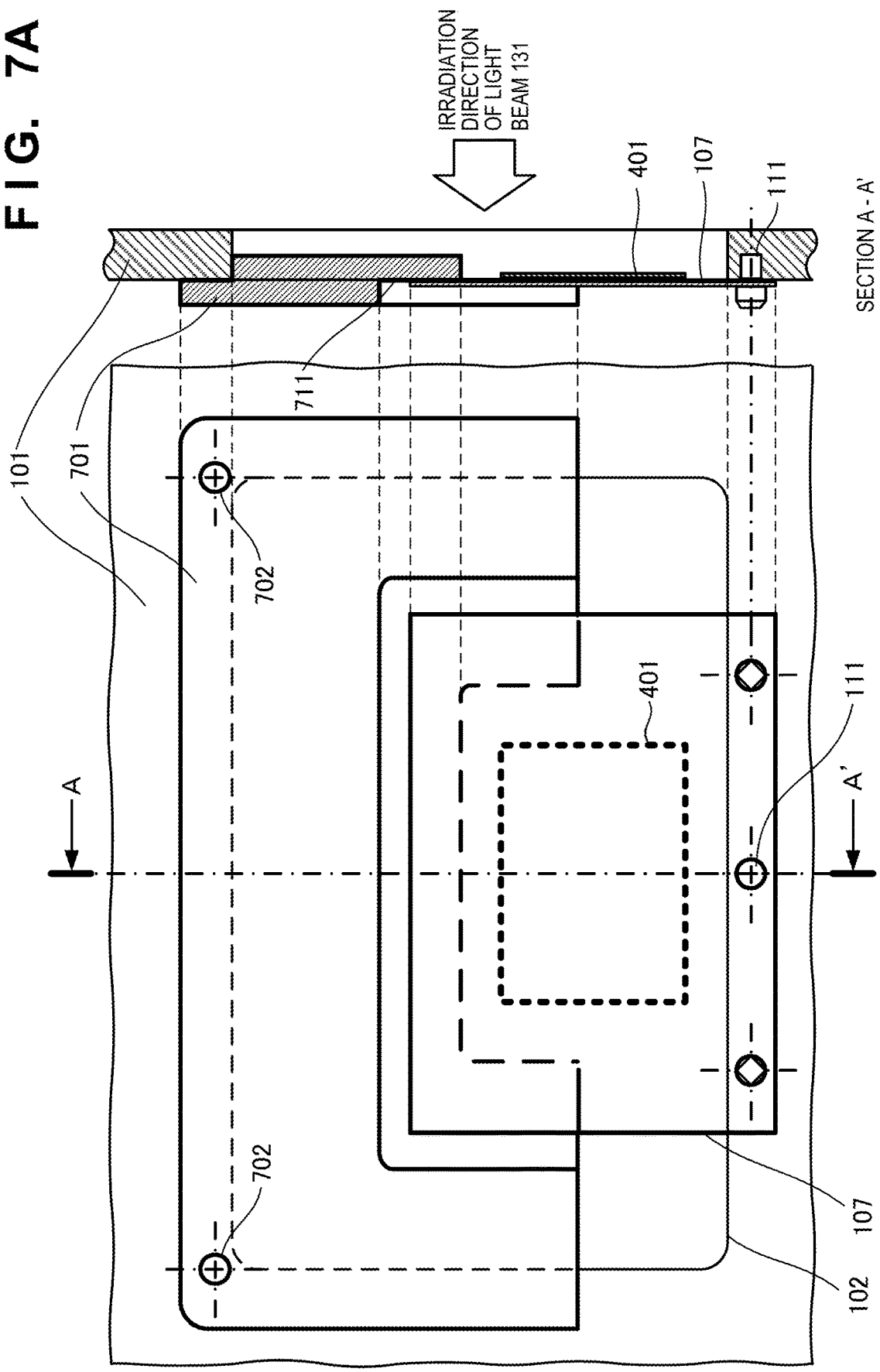

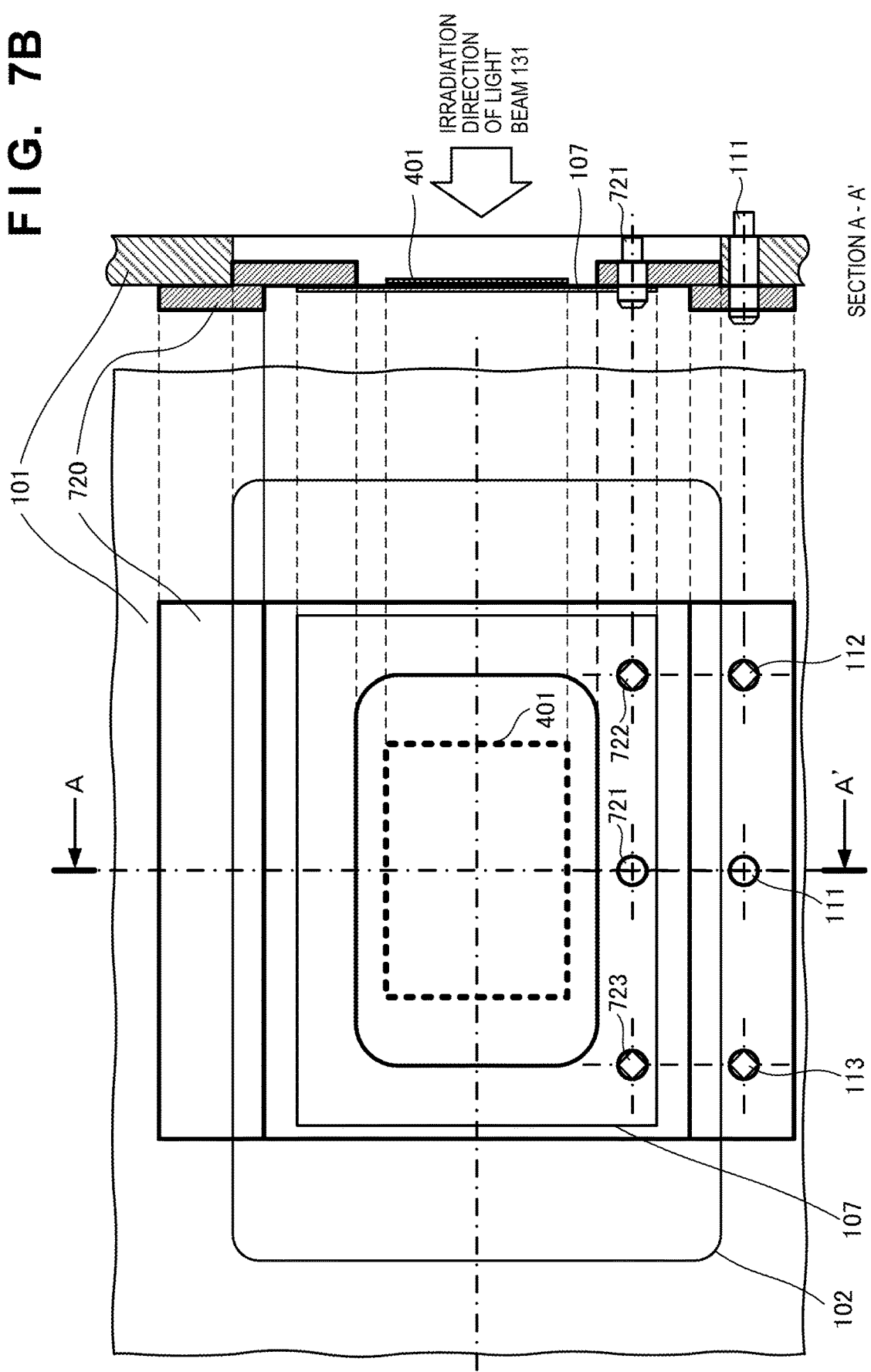

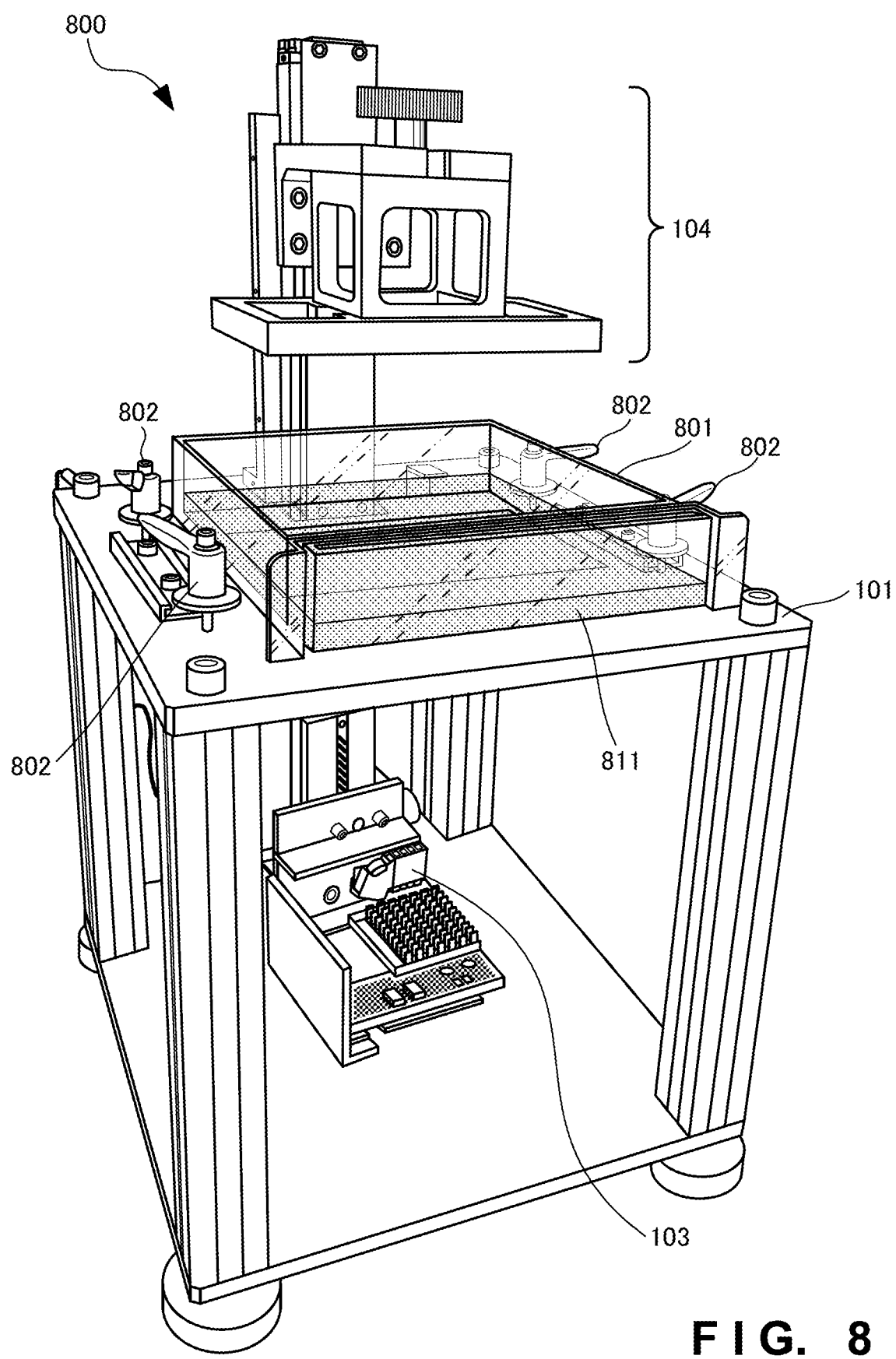
F I G. 8

PATTERN FORMING SHEET, PATTERN MANUFACTURING APPARATUS, AND PATTERN MANUFACTURING METHOD

This application is based upon and claims the benefit of priority from Japanese patent application No. 2017-081401, filed on Apr. 17, 2017, the disclosure of which is incorporated herein in its entirety by reference.

BACKGROUND OF THE INVENTION

Field of the Invention

The present invention relates to a pattern forming sheet, a pattern manufacturing apparatus, and a pattern manufacturing method.

Description of the Related Art

In the above technical field, patent literature 1 discloses a technique of making positioning pins each corresponding to one of a plurality of reference holes formed in a sheet and including a small-diameter portion and a reference diameter portion, which are connected by a tapered portion, extend through the reference holes, thereby implementing positioning.

[Patent Literature 1] Japanese Patent Laid-Open No. 2006-319138

SUMMARY OF THE INVENTION

In the technique described in the above literature, however, it is impossible to perform positioning for the obverse surface and the reverse surface of a sheet and shape a pattern on both surfaces of the sheet.

The present invention enables to provide a technique of solving the above-described problem.

One example aspect of the present invention provides a pattern forming sheet in which an admixture containing a conductive material and a photo-curing resin is applied to at least one of an obverse surface and a reverse surface, wherein at least one positioning reference hole is provided.

Another example aspect of the present invention provides a pattern manufacturing apparatus comprising:
a forming unit that forms a pattern by irradiating the above pattern forming sheet with a light beam; and
a first pin that can be fitted in a positioning reference hole provided in the pattern forming sheet.

Still other example aspect of the present invention provides the pattern manufacturing apparatus, wherein the first pin can be fitted in a positioning hole provided in a reference chart used to adjust an irradiation position of the light beam.

Still other example aspect of the present invention provides a pattern manufacturing method by a pattern manufacturing apparatus including:
a forming unit that forms a pattern by irradiating a pattern forming sheet with a light beam; and
a first pin that can be fitted in a positioning reference hole provided in the pattern forming sheet, the method comprising:
aligning the pattern forming sheet, setting the pattern forming sheet in the pattern manufacturing apparatus, and irradiating one surface of the pattern forming sheet with the light beam to form the pattern; and
turning over the pattern forming sheet, aligning the pattern forming sheet, and irradiating the other surface of the pattern forming sheet with the light beam to form the pattern.

According to the present invention, it is possible to perform positioning for the obverse surface and the reverse surface of a sheet and shape a pattern on each of the two surfaces of the sheet.

BRIEF DESCRIPTION OF THE DRAWINGS

FIG. 6 is a view for explaining still another example of the pattern forming sheet used in the pattern manufacturing apparatus according to the first example embodiment of the present invention;

FIG. 7A shows views for explaining an example of an adapter used in the pattern manufacturing apparatus according to the first example embodiment of the present invention;

FIG. 7B shows views for explaining another example of the adapter used in the pattern manufacturing apparatus according to the first example embodiment of the present invention;

FIG. 8 is a perspective view showing the overall arrangement of a pattern manufacturing apparatus according to the second example embodiment of the present invention.

DESCRIPTION OF THE EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

A pattern manufacturing apparatus 100 according to the first example embodiment of the present invention will be described with reference to FIGS. 1A to 7B. The pattern manufacturing apparatus 100 is an apparatus that manufactures a circuit pattern or a three-dimensional shaped object.

Figure 1A:
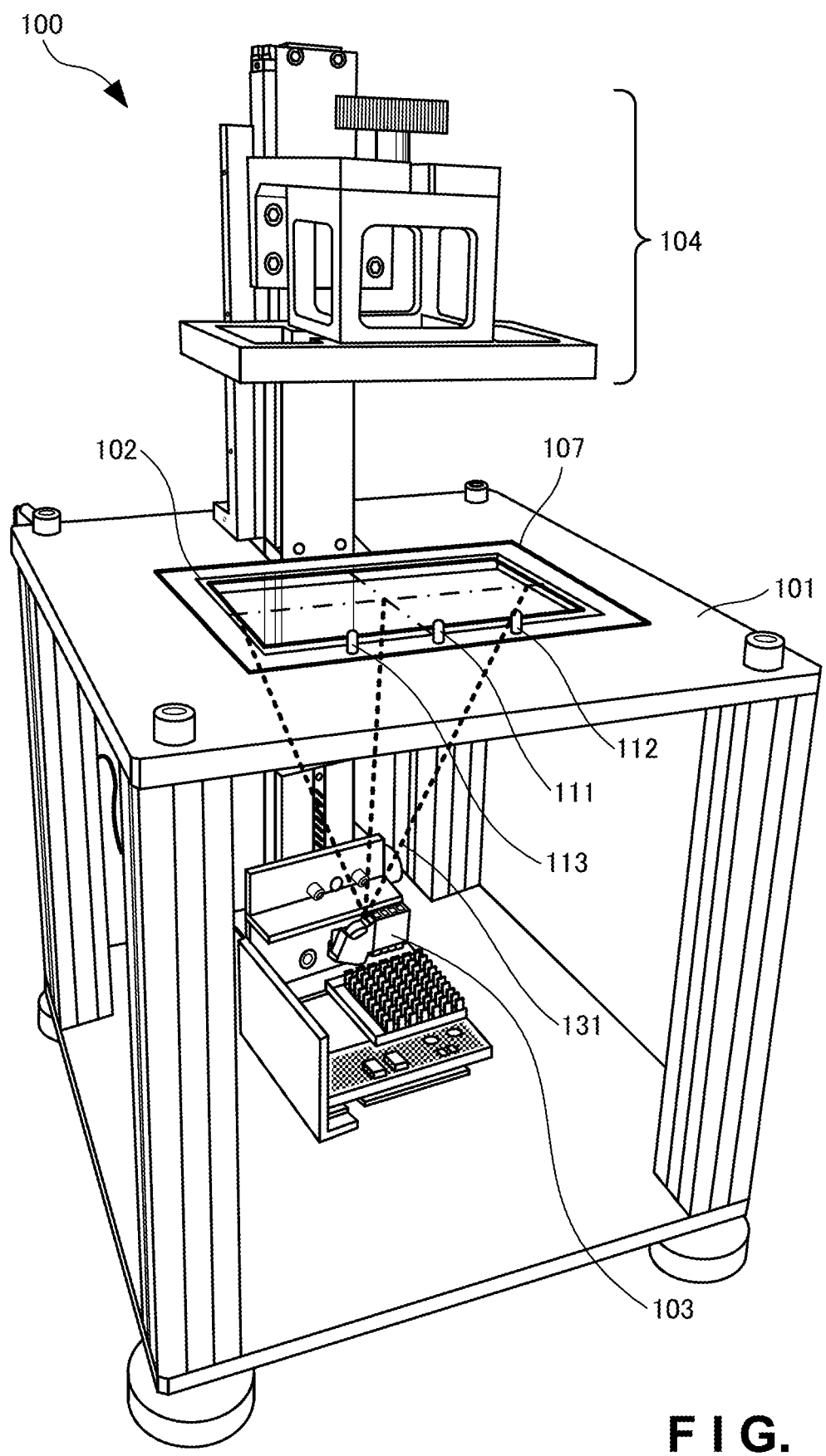
FIG. 1A is a perspective view showing the overall arrangement of a pattern manufacturing apparatus according to the first example embodiment of the present invention.
Figure 1B:
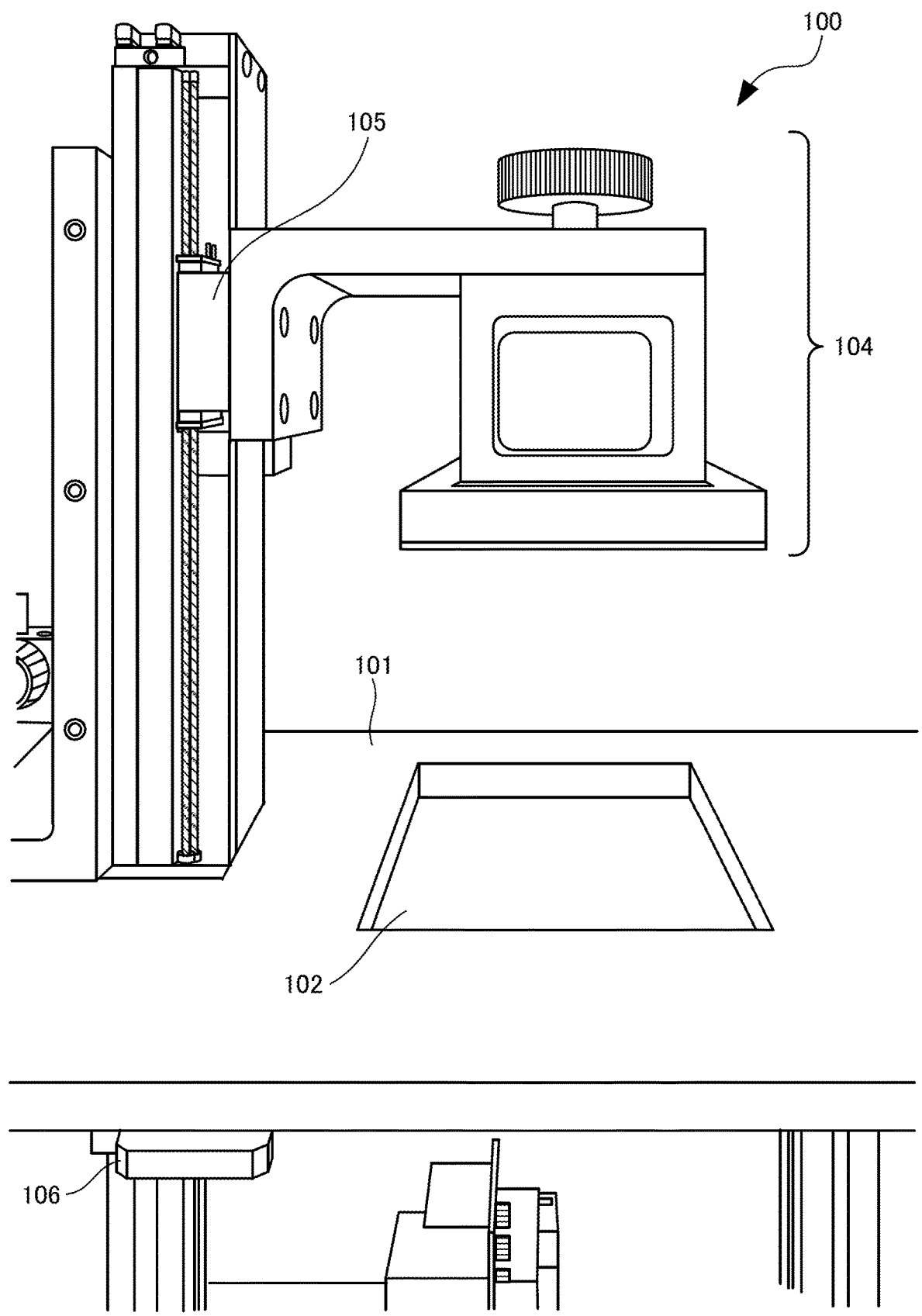
FIG. 1B is a partially enlarged side view of the pattern manufacturing apparatus according to the first example embodiment of the present invention.

FIG. 1A is a perspective view showing the overall arrangement of the pattern manufacturing apparatus 100 according to this example embodiment. FIG. 1B is a partially enlarged side view of the pattern manufacturing apparatus 100 according to this example embodiment. As shown in FIGS. 1A and 1B, the pattern manufacturing apparatus 100 includes a shaping base 101, a light beam irradiation window 102, an optical engine 103, a lifting head 104, a head feed mechanism 105, and a stepping motor 106. The size of the pattern manufacturing apparatus 100 is, for example, 250 mm (width)×291 mm (depth)×490 mm (height).

A pattern forming sheet 107 is placed on the shaping base 101. Although not illustrated, the pattern forming sheet 107 is provided with a positioning reference hole and rotation preventing holes, which match a positioning pin 111 and rotation preventing pins 112 and 113, respectively. The positioning pin 111 has a round shape, and the rotation preventing pins 112 and 113 each have a rhombic (diamond) shape.

When manufacturing a circuit pattern or the like using the pattern manufacturing apparatus 100, the pattern forming sheet 107 to which an admixture containing a conductive material and a photo-curing resin is applied is placed on the shaping base 101, and the optical engine 103 emits a light beam 131. Examples of the conductive material are silver, gold, copper, platinum, lead, zinc, tin, iron, aluminum, palladium, and carbon. However, the conductive material is not limited to these. Representative examples of the photo-curing resin are UV curing resins such as an acrylic resin (polymer-type acrylate), an urethane resin (urethane acrylate), a vinylester resin, and a polyester alkyd resin (epoxy acrylate). The photo-curing resin is not limited to these as long as it is cured by a light beam.

The optical engine 103 is a high-power precise engine. Note that the light beam 131 emitted from the optical engine 103 has a wavelength of 405 nm. However, the wavelength is not limited to this and may be 200 nm to 400 nm. The light beam 131 emitted from the optical engine 103 is focus free. Note that the pattern forming sheet 107 is not illustrated in FIG. 1B.

Although a detailed arrangement of the optical engine 103 is not illustrated, the optical engine 103 includes a light source, a reflecting mirror, a photodetector, a two-dimensional MEMS (Micro Electro Mechanical Systems) mirror, and the like. The light source includes a semiconductor LD (Laser Diode) or a collimator lens. The semiconductor LD is a laser oscillation element that oscillates a UV laser beam or the like. Note that the laser oscillation element is not limited to the semiconductor LD, and may be an LED (Light Emitting Diode). The two-dimensional MEMS mirror is a driven mirror driven based on a control signal input from the outside. The two-dimensional MEMS mirror is a device that vibrates to reflect the laser beam while changing the angle in the horizontal direction (X direction) and the vertical direction (Y direction). The optical engine 103 has a resolution of 720 P or 1080 P, and has a width of about 30 mm, a depth of about 15 mm, a height of about 7 mm, and a volume of about 3 cc. One or a plurality of semiconductor LDs may be arranged in the optical engine 103, and a necessary number of optical engines are arranged in accordance with the application purpose. The spot size of the light beam 131 emitted from the optical engine 103 is 75 μm but can be changed in accordance with the application purpose.

The shaping base 101 is provided with the light beam irradiation window 102. The light beam 131 emitted from the optical engine 103 passes through the light beam irradiation window 102 and irradiates the pattern forming sheet 107 placed on the shaping base 101. The light beam irradiation window 102 is an opening portion provided in the shaping base 101 or a hole formed in the shaping base 101.

The lifting head 104 is used to manufacture a three-dimensional shaped object. The lifting head 104 is moved up and down by the head feed mechanism 105 and the stepping motor 106. The head feed mechanism 105 is a high-rigidity ball screw feed mechanism. The stepping motor 106 is a high-torque stepping motor. Note that the structure for moving up and down the lifting head 104 is not limited to the structure using the head feed mechanism 105 and the stepping motor 106. In addition, the head feed mechanism 105 is not limited to the ball screw feed mechanism.

The head feed mechanism 105 is a high-rigidity and high-speed precision feed mechanism. In addition, the feed speed of the head feed mechanism 105 is, for example, 3 kg weight·50 mm/sec·2.5 μm pitch. In addition, the lifting head 104 is a high-rigidity lightweight head.

The application of the admixture to the pattern forming sheet 107 is done by, for example, setting a silk screen film provided with an application region in a screen printer. Alternatively, instead of using a screen printer, the admixture may directly be applied to the pattern forming sheet 107 using a select roller or the like. The application of the admixture is not limited to these methods.

Figure 2A:
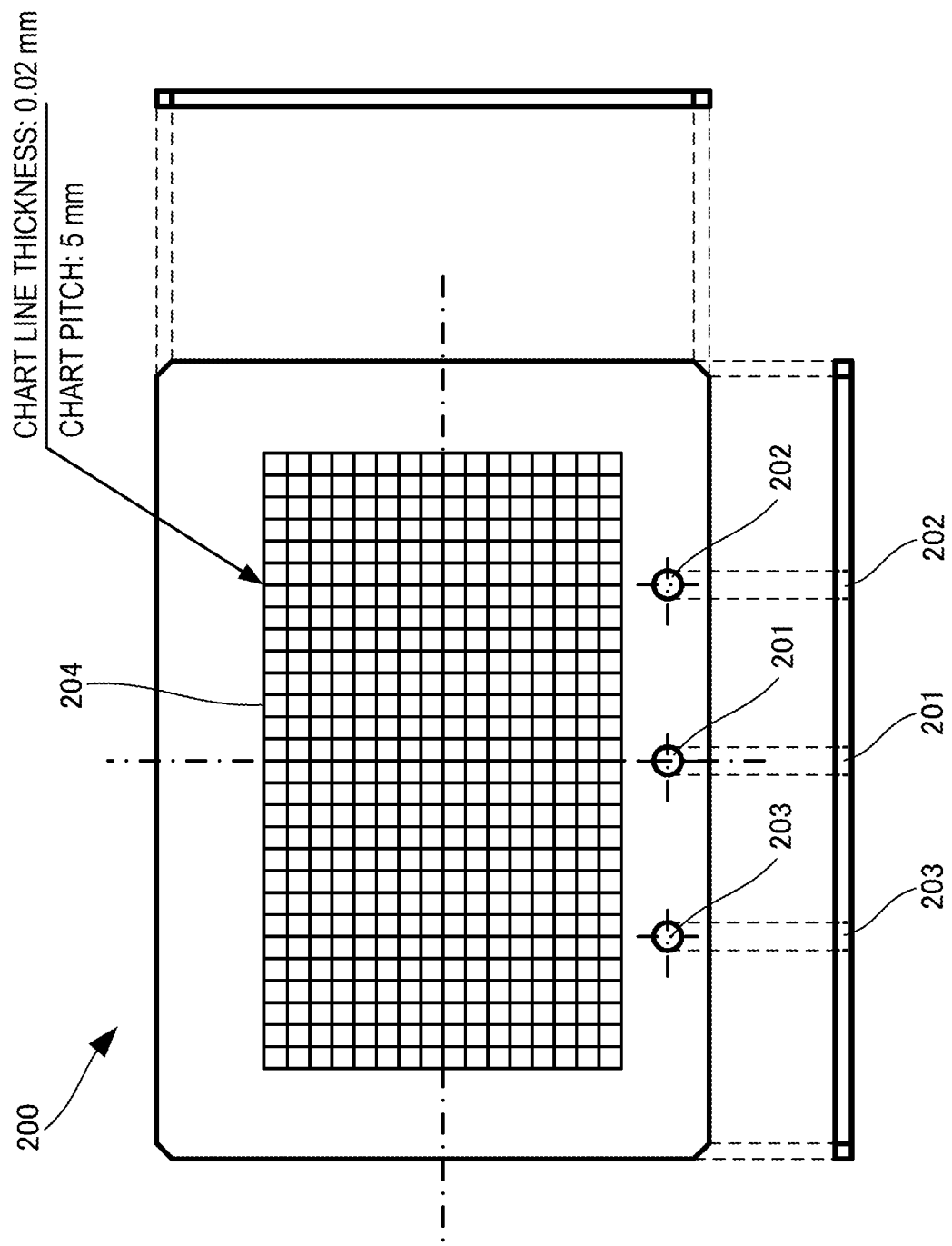
FIG. 2A is a view showing the overall arrangement of a reference chart used for optical system positioning of the pattern manufacturing apparatus according to the first example embodiment of the present invention.

FIG. 2A is a view showing the overall arrangement of a reference chart 200 used for optical system positioning of the pattern manufacturing apparatus 100 according to this example embodiment. Before forming a pattern on the pattern forming sheet 107 using the pattern manufacturing apparatus 100, positioning of the optical system of the pattern manufacturing apparatus 100 is performed. That is, calibration of the pattern manufacturing apparatus 100 is performed using the reference chart 200.

In the reference chart 200, a positioning reference hole 201 is provided near the center of the lower side of the reference chart. In addition, rotation preventing holes 202 and 203 configured to prevent the reference chart 200 from rotating are provided near the two ends of the lower side of the reference chart 200, that is, on the both sides of the positioning reference hole 201.

Additionally, reference chart scribe lines 204 are drawn (scribed) on the reference chart 200. The reference chart scribe lines 204 have a thickness of 0.02 mm each and a pitch of 5 mm. However, the present invention is not limited to this. In addition, the reference chart 200 is made of glass and has a thickness of 3 mm. However, the present invention is not limited to this.

The reference chart 200 is placed on the shaping base 101 such that the positioning pin 111 of the pattern manufacturing apparatus 100 and the positioning reference hole 201 of the reference chart 200 match. In this case, if only the positioning reference hole 201 is provided in the reference chart 200, the reference chart 200 rotates about the positioning reference hole 201 (positioning pin 111), and the position of the reference chart 200 shifts.

Hence, the rotation preventing holes 202 and 203 are provided on both sides of the positioning reference hole 201, and the rotation preventing holes 202 and 203 are matched with the rotation preventing pins 112 and 113, respectively, thereby preventing the reference chart 200 from rotating or moving on the shaping base 101. The rotation preventing holes 202 and 203 need only be provided near the four corners of the reference chart 200 or at least one of the four corners. However, the present invention is not limited to this as long as the rotation of the reference chart 200 can be prevented.

Figure 2B:
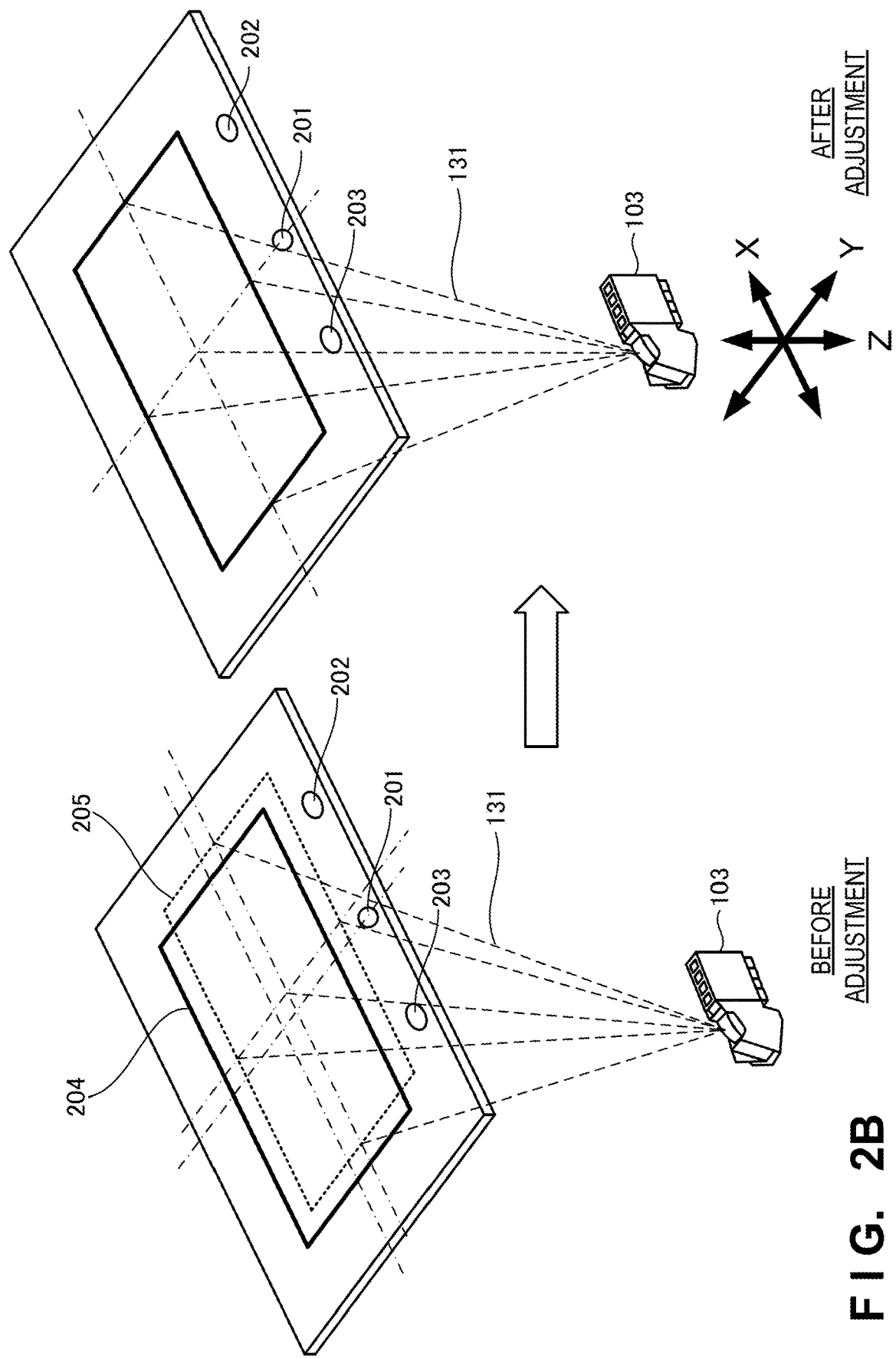
FIG. 2B shows views for explaining optical system positioning of the pattern manufacturing apparatus according to the first example embodiment of the present invention.

FIG. 2B shows views for explaining optical system positioning of the pattern manufacturing apparatus 100 according to this example embodiment. The left view of FIG. 2B shows a state before optical system positioning (before adjustment) of the pattern manufacturing apparatus 100, and the right view of FIG. 2B shows a state after optical system positioning (after adjustment) of the pattern manufacturing apparatus 100.

First, the reference chart 200 is set on the shaping base 101 of the pattern manufacturing apparatus 100. Next, a projection image 205 such as a rectangular ridge line (reference line) is projected. The optical engine 103 is moved in the X-, Y-, and Z-directions by an adjustment mechanism (not shown) to align the projection image 205 with the reference chart 200. The optical system positioning may manually be performed by the operator, or an automatic positioning mechanism for the optical system may be provided in the pattern manufacturing apparatus 100 so that the pattern manufacturing apparatus 100 automatically performs the optical system positioning.

When the optical system positioning of the pattern manufacturing apparatus 100 is thus completed, a pattern is manufactured using the pattern forming sheet 107. Details of the pattern forming sheet 107 used to manufacture a pattern will be described next.

Figure 3A:
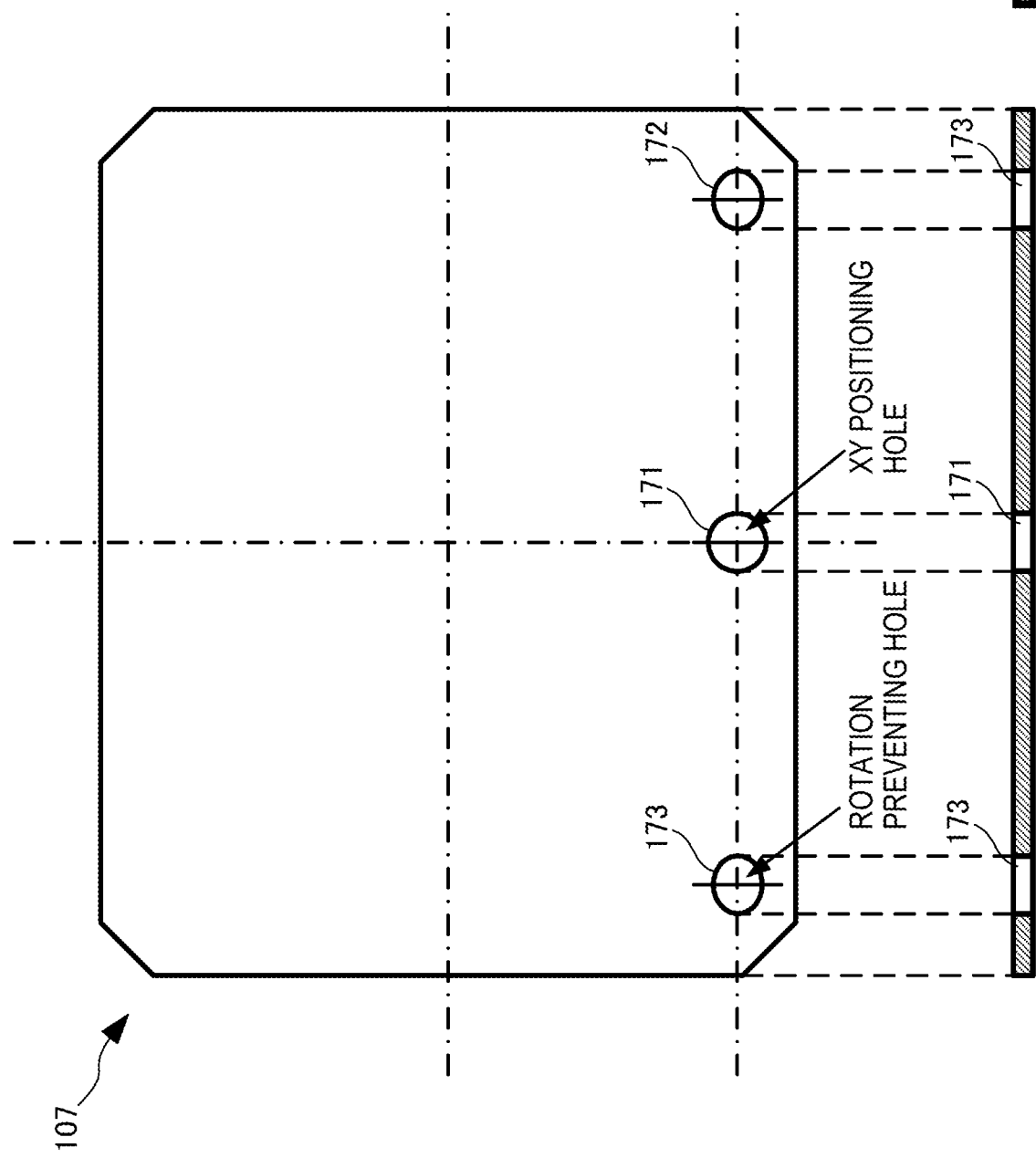
FIG. 3A is a view for explaining an example of a pattern forming sheet used in the pattern manufacturing apparatus according to the first example embodiment of the present invention.

FIG. 3A is a view for explaining an example of the pattern forming sheet used in the pattern manufacturing apparatus 100 according to this example embodiment. A positioning reference hole 171 is provided near the center of the lower side of the pattern forming sheet 107. The pattern forming sheet 107 is rectangular. However, the shape is not limited to this.

Rotation preventing holes 172 and 173 configured to prevent the pattern forming sheet 107 from moving or rotating are provided near the two ends of the lower side of the pattern forming sheet 107, that is, on the both sides of the positioning reference hole 171. The positioning reference hole 171 has an almost circular shape, and the rotation preventing holes 172 and 173 each have an almost elliptical shape. However, the shapes are not limited to these.

Figure 3B:
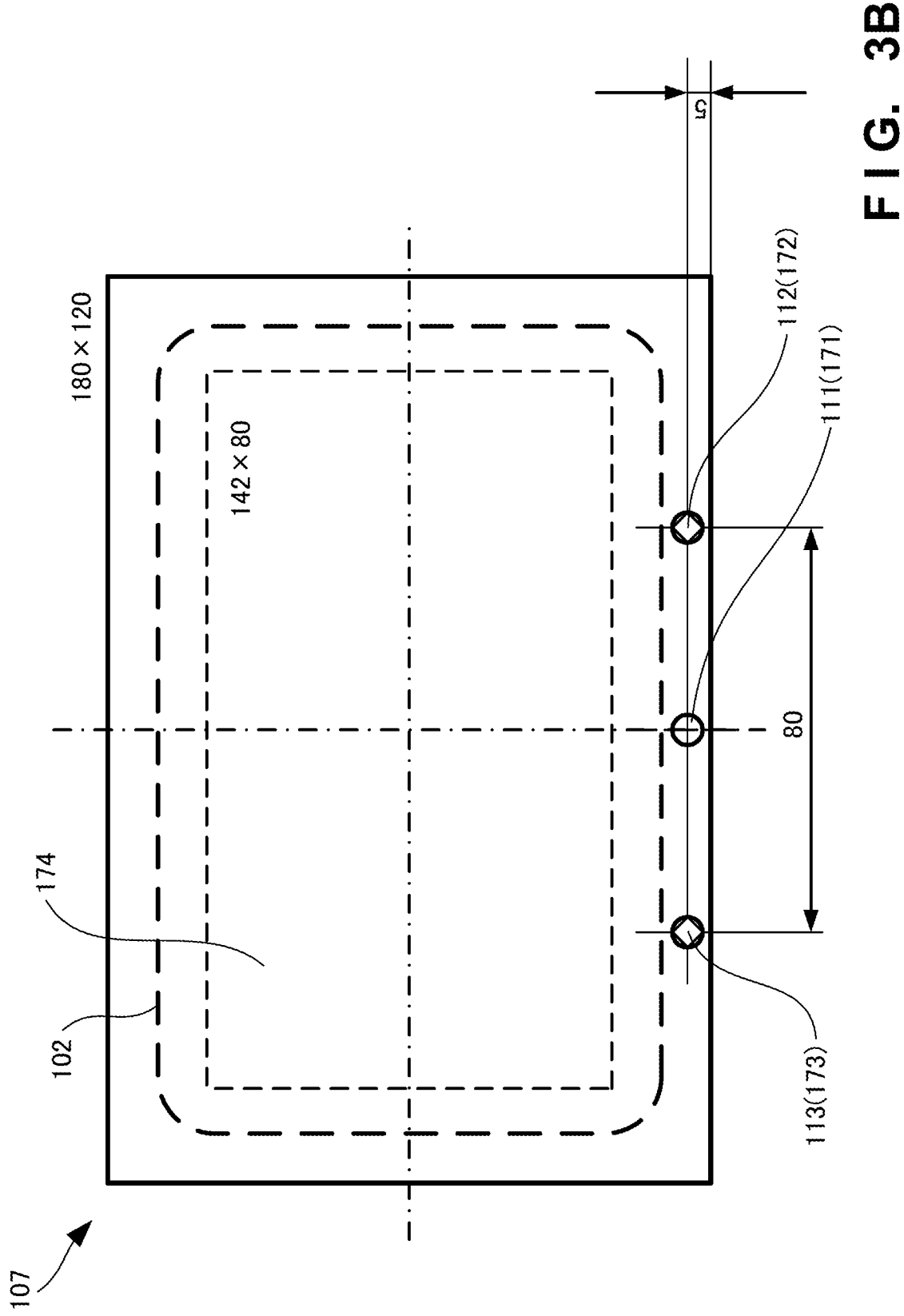
FIG. 3B is a view for explaining the pattern forming surface of the pattern forming sheet used in the pattern manufacturing apparatus according to the first example embodiment of the present invention.

FIG. 3B is a view for explaining the pattern forming surface of the pattern forming sheet used in the pattern manufacturing apparatus 100 according to this example embodiment. The size of the pattern forming sheet 107 is 180 mm×120 mm, and the size of an application surface 174 of the admixture is 142 mm×80 mm. However, the sizes are not limited to these. The admixture can be applied to both of the obverse and reverse surfaces of the pattern forming sheet 107. As described above, the pattern forming sheet 107 has a structure in which the application surface 174 for an admixture paste is formed on an insulating sheet base (PET, PI, or the like). Note that the admixture may be applied to at least one of the obverse and reverse surfaces of the pattern forming sheet 107, for example, the obverse surface (or reverse surface).

In addition, the center of each of the positioning reference hole 171 and the rotation preventing holes 172 and 173 is located at a position 5 mm apart from the lower end of the pattern forming sheet 107. The center of the rotation preventing hole 172 and the center of the rotation preventing hole 173 are spaced apart by 80 mm. In addition, the positioning reference hole 171 is located in the middle of the pattern forming sheet 107. Note that the numerical values and positions described here are merely examples, and the numerical values and positions are not limited to these. For example, the positioning reference hole 171 may be provided near each of the four corners of the pattern forming sheet 107.

The pattern forming sheet 107 with the admixture applied is set on the light beam irradiation window 102 of the shaping base 101. The pattern forming sheet 107 is set on the shaping base 101 such that the positioning reference hole 171 is aligned with the positioning pin 111 provided on the shaping base 101. The positioning pin 111 and the positioning reference hole 171 exactly fit because they have almost the same circular shape.

The rotation preventing holes 172 and 173 of the pattern forming sheet 107 are set so as to be aligned with the rotation preventing pins 112 and 113 provided in the shaping base 101. The rotation preventing pins 112 and 113 are diamond locating pins each having a rhombic shape. The major axis of the diamond locating pin almost matches the major axis of each of the elliptical rotation preventing holes 172 and 173, and the pattern forming sheet 107 is reliably fixed on the shaping base 101. Note that the shapes of the rotation preventing pins 112 and 113 and the rotation preventing holes 172 and 173 are not limited to those described above. An example in which the length of the major axis of the diamond locating pin matches the length of the major axis of each of the rotation preventing holes 172 and 173 has been described here. However, the lengths of minor axes may match. Each of the rotation preventing holes 172 and 173 has a horizontally long elliptical shape. However, the elliptical shape may be long in the vertical direction.

Figure 4A:
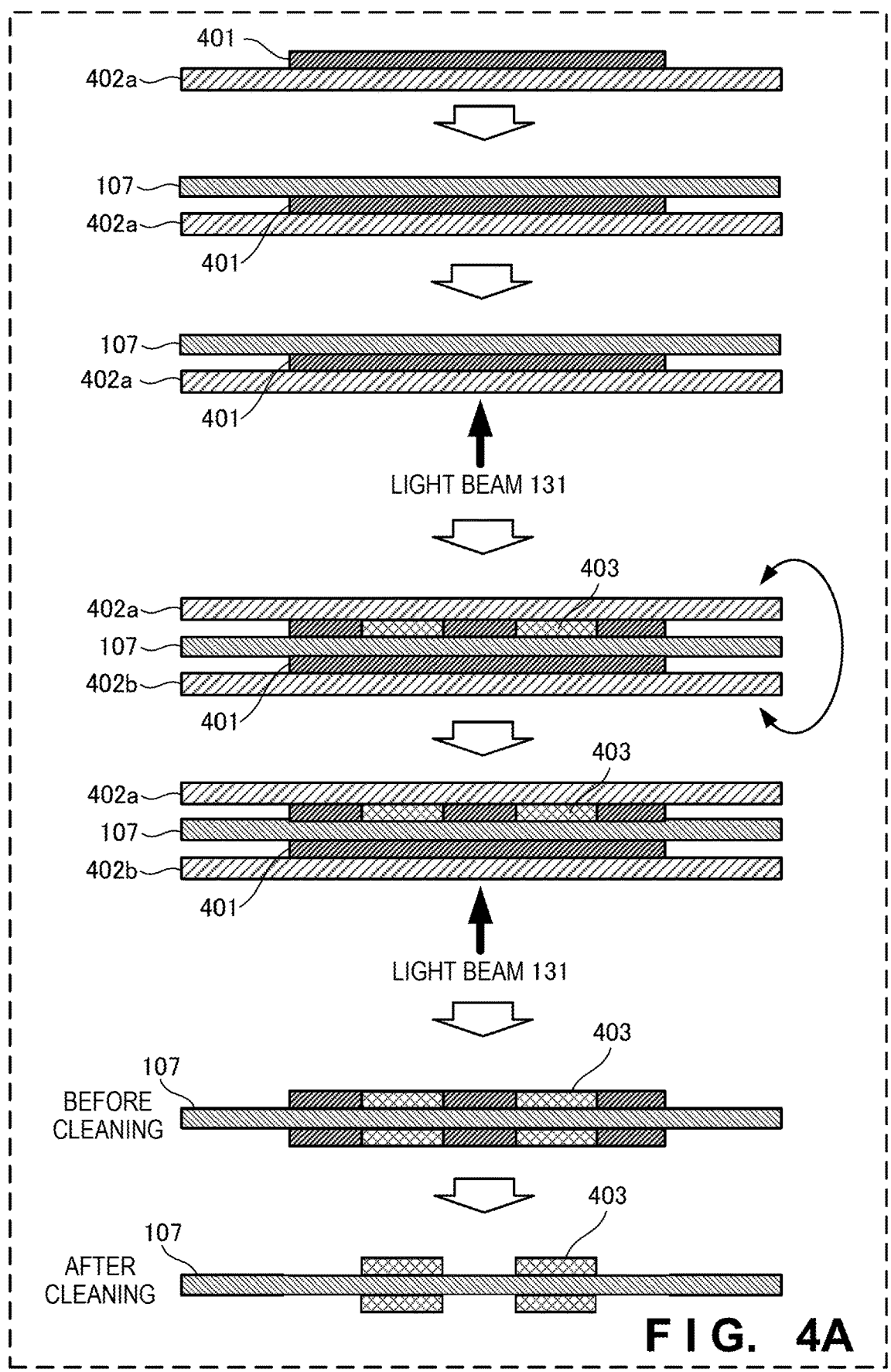
FIG. 4A shows views for explaining the double-sided pattern forming procedure of the pattern manufacturing apparatus according to the first example embodiment of the present invention.

FIG. 4A shows views for explaining the double-sided pattern manufacturing procedure of the pattern manufacturing apparatus 100 according to this example embodiment. In the uppermost view of FIG. 4A, an admixture 401 containing a conductive material and a photo-curing resin is applied to a sheet 402a. The base sheet of the sheet 402a is transparent. The admixture 401 is, for example, a paste.

Next, in the second view from the top, the sheet 402a with the admixture 401 applied is bonded to the pattern forming sheet 107 of PET (Polyethylene Terephthalate) or PI (Polyimide). In this case, the positioning reference hole 171 and the rotation preventing holes 172 and 173 are provided in the pattern forming sheet 107. The positioning reference hole 171 of the pattern forming sheet 107 is aligned with the positioning pin 111, and the pattern forming sheet 107 is set on the shaping base 101 of the pattern manufacturing apparatus 100.

In the third view from the top, the pattern forming sheet 107 set on the shaping base 101 is irradiated with the focus-free light beam 131 with a wavelength of 405 nm to cure the admixture 401. A circuit pattern is projected from the optical engine 103 to the pattern forming sheet 107. Of the admixture 401, portions irradiated with the light beam 131 are cured.

In the fourth view from the top, the admixture 401 is applied to a sheet 402b. The sheet 402b with the admixture 401 applied is bonded to the opposite surface of the pattern forming sheet 107. The pattern forming sheet 107 is turned over and set on the shaping base 101.

In the fifth view from the top, the pattern forming sheet 107 is irradiated with the light beam 131 to cure the admixture 401, thereby forming a pattern.

In the sixth view from the top, the sheets 402a and 402b are peeled from the pattern forming sheet 107.

In the lowermost view, the pattern forming sheet 107 is cleaned to remove the uncured admixture 401. Then, cured portions 403 of the admixture 401 remain on the pattern forming sheet 107. The cleaning of the pattern forming sheet 107 is done by IPA (Isopropyl Alcohol) or ultrasonic cleaning. After the cleaning, drying or baking is performed as needed.

Figure 4B:
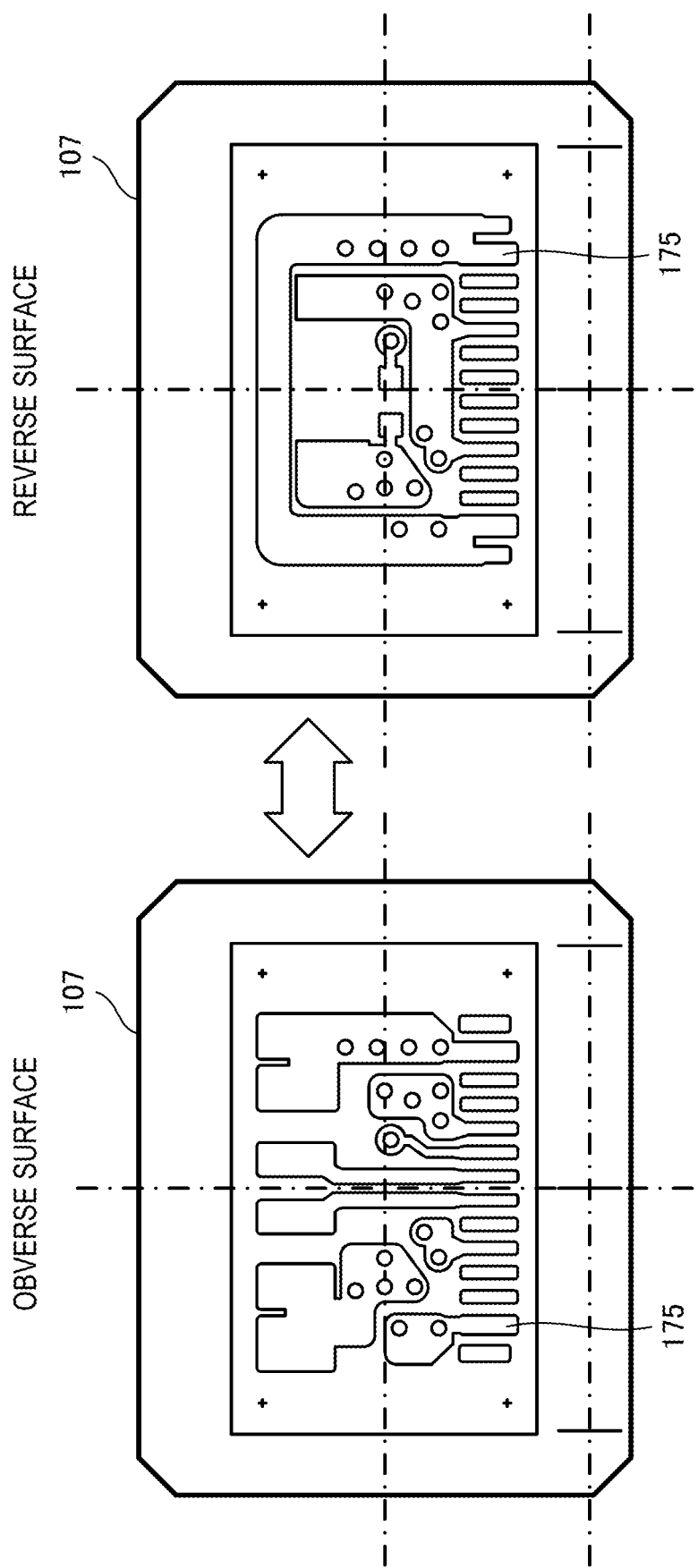
FIG. 4B shows views for explaining patterns formed on the obverse surface and the reverse surface of the pattern forming sheet by the pattern manufacturing apparatus according to the first example embodiment of the present invention.

FIG. 4B shows views for explaining patterns formed on the obverse surface and the reverse surface of the pattern forming sheet 107 by the pattern manufacturing apparatus 100 according to this example embodiment. A circuit pattern can be manufactured on both surfaces as shown in FIG. 4B in accordance with the procedure shown in FIG. 4A.

As described above, in the double-sided circuit pattern, the positions of lands 175 need to match between the obverse surface (one surface) and the reverse surface (other surface), and the obverse surface and the reverse surface need to be correctly positioned. For this purpose, the circular positioning reference hole 171 is provided in the pattern forming sheet 107 and matched with the circular positioning pin 111 of the shaping base 101. Hence, the positions do not shift between the obverse surface and the reverse surface. That is, since the position of the positioning pin 111 of the pattern manufacturing apparatus 100 does not change and remains the same, alignment can be done between the obverse surface and the reverse surface of the pattern forming sheet 107.

The accuracy in manufacturing the double-sided circuit pattern, that is, the position shift of the land 175 between the obverse surface and the reverse surface need only be at least 50 μm or less. When the pattern forming sheet 107 is used, the accuracy is several tens μm, and a sufficient accuracy is ensured.

As described above, when the pattern manufacturing apparatus 100 and the pattern forming sheet 107 are used, a precise circuit pattern can be shaped.

Note that an example in which a double-sided circuit pattern is manufactured by bonding the sheets 402a and 402b to the pattern forming sheet 107 has been described here. However, the double-sided circuit pattern may be manufactured by applying the admixture 401 to both surfaces of the pattern forming sheet 107.

Figure 5:
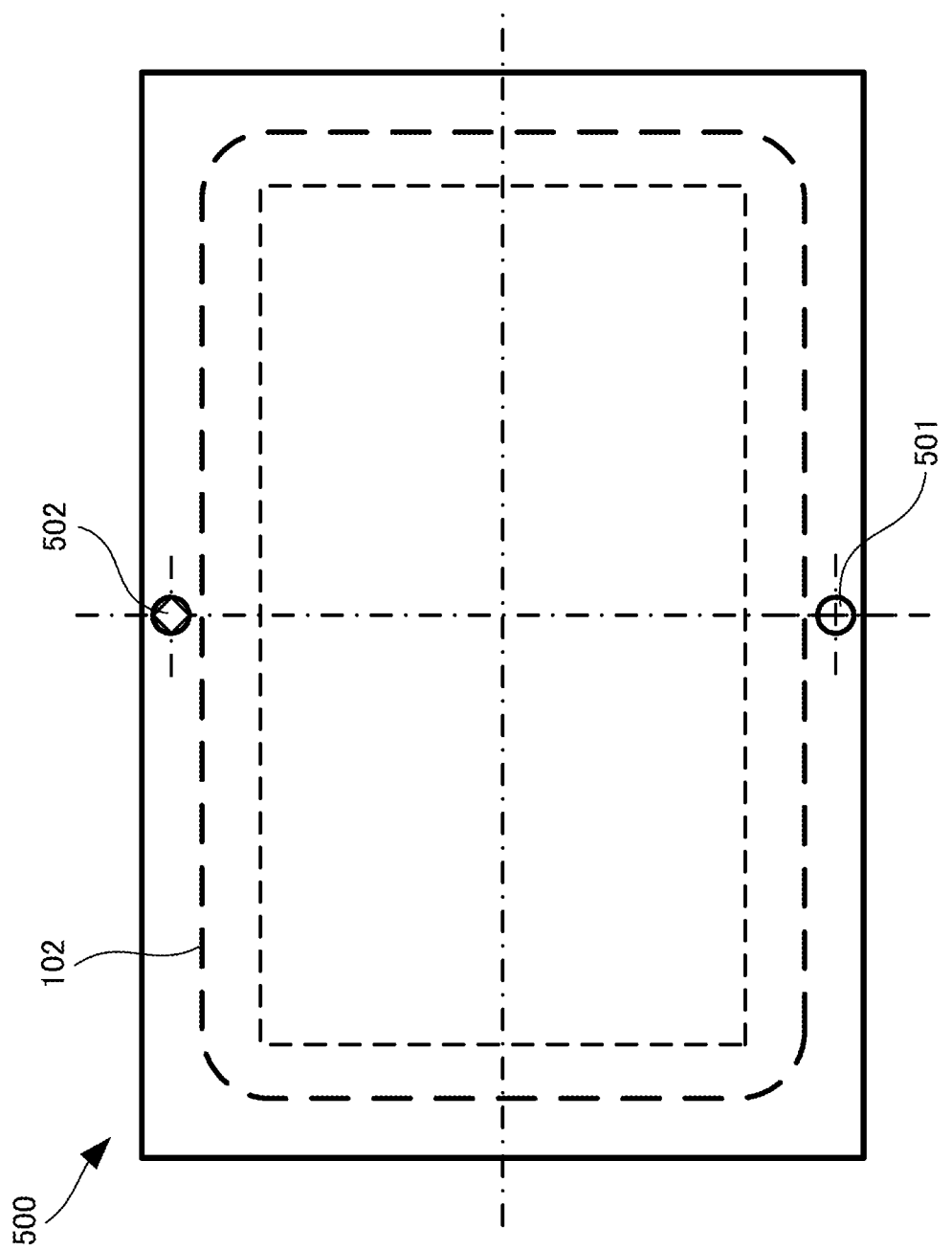
FIG. 5 is a view for explaining another example of the pattern forming sheet used in the pattern manufacturing apparatus according to the first example embodiment of the present invention.

FIG. 5 is a view for explaining another example of a pattern forming sheet 500 used in the pattern manufacturing apparatus 100 according to this example embodiment. FIG. 5 shows a state in which the pattern forming sheet 500 is set on the shaping base 101 of the pattern manufacturing apparatus 100. The pattern forming sheet 500 includes a positioning reference hole 501 near the center of the lower side and a rotation preventing hole 502 near the center of the upper side. As compared to the pattern forming sheet 107, the position of the positioning reference hole 501 in the pattern forming sheet 500 is the same, but the rotation preventing hole 502 is different in the position and number.

The pattern manufacturing apparatus 100 is provided with the rotation preventing pin 112 (113) at a position corresponding to the rotation preventing hole 502 of the pattern forming sheet 500. The rotation preventing pin 112 and the rotation preventing hole 502 prevent the pattern forming sheet 500 from rotating or moving.

FIG. 6 is a view for explaining still another example of a pattern forming sheet 600 used in the pattern manufacturing apparatus 100 according to this example embodiment. FIG. 6 shows a state in which the pattern forming sheet 600 is set on the shaping base 101 of the pattern manufacturing apparatus 100. The pattern forming sheet 600 includes a positioning reference hole 601 near the center of the lower side, like the pattern forming sheet 107.

In the pattern forming sheet 600, stoppers 602 for rotation prevention are provided at the two ends of the lower side in place of the rotation preventing holes 172 and 173 and the rotation preventing hole 502, unlike the pattern forming sheets 107 and 500. The stoppers 602 may be heavier than the pattern forming sheet 107, like, for example, weights, or may have a large friction with respect to the shaping base 101.

The shaping base 101 of the pattern manufacturing apparatus 100 may be provided with projecting portions (not shown) configured to catch the stoppers 602. If the projecting portions are provided, the stoppers 602 and the projecting portions cooperatively prevent the rotation of the pattern forming sheet 600. Note that the stopper 602 need only be provided at at least one of the four corners of the pattern forming sheet 600. However, the shape, placing positions, and number of stoppers are not limited to those described here.

FIG. 7A shows views for explaining an example of an adapter 701 used in the pattern manufacturing apparatus 100 according to this example embodiment. In FIG. 7A, the left view is a plan view, and the right view is a sectional view taken along a line A-A'.

For example, if the size of the pattern forming sheet 107 is smaller than the light beam irradiation window 102, the pattern forming sheet 107 cannot be placed on the shaping base 101 without a tool, and a small pattern cannot be shaped. That is, the pattern forming sheet 107 drops from the light beam irradiation window 102.

To prevent this, the adapter 701 configured to prevent the pattern forming sheet 107 from dropping is set on the light beam irradiation window 102 of the shaping base 101. That is, the adapter 701 is set on the shaping base 101 to temporarily decrease the size of the hole formed by the light beam irradiation window 102, thereby preventing the dropping of the pattern forming sheet 107.

The adapter 701 has a cantilevered shape. The adapter 701 is fixed on the shaping base 101 so as to partially close the light beam irradiation window 102 of the shaping base 101. A placing surface 711 of the adapter 701 to place the pattern forming sheet 107 and the placing surface of the shaping base 101 to place the pattern forming sheet 107 are flush with each other. Since this ensures a predetermined distance from the optical engine 103 to the pattern forming sheet 107, recalibration or readjustment of the optical engine 103 is unnecessary.

The adapter 701 is provided with positioning reference holes 702. For example, the adapter 701 may be fixed to the shaping base 101 using the positioning reference hole 702 and screws. Alternatively, attaching pins for the adapter 701 may be provided on the shaping base 101, and the adapter 701 may be fixed to the shaping base 101 using the pins and the positioning reference holes 702.

FIG. 7B shows views for explaining another example of an adapter 720 used in the pattern manufacturing apparatus 100 according to this example embodiment. In FIG. 7B, the left view is a plan view, and the right view is a sectional view taken along a line A-A'.

The adapter 720 has a center impeller shape, and is provided with a hole capable of passing the light beam 131 at the center. The pattern forming sheet 107 is set on the hole. The adapter 720 is fixed on the shaping base 101 so as to partially close the light beam irradiation window 102 of the shaping base 101. A placing surface of the adapter 720 to place the pattern forming sheet 107 and the placing surface of the shaping base 101 to place the pattern forming sheet 107 are flush with each other. Since this ensures a predetermined distance from the optical engine 103 to the pattern forming sheet 107, recalibration or readjustment of the optical engine 103 is unnecessary.

The adapter 720 is provided with a positioning pin 721 and rotation preventing pins 722 and 723. The pattern forming sheet 107 is fixed to the adapter 720 by the positioning pin 721 and the rotation preventing pins 722 and 723. The pattern forming sheet 107 is indirectly fixed to the adapter 720 in this way and thus fixed to the shaping base 101.

The adapter 720 is fixed to the shaping base 101 using the positioning pin 111 or a screw or the like. Note that since the adapter 720 has a center impeller shape, it may simply be placed on the shaping base 101 and fixed to the shaping base 101 without using the positioning pin 721 or a screw.

As described above with reference to FIGS. 7A and 7B, even if the size of the pattern forming sheet 107 is smaller than the light beam irradiation window 102, a small circuit pattern or the like can be shaped on both surfaces of the pattern forming sheet 107 or the like using the adapter 701 or 720.

According to this example embodiment, the pattern forming sheet or a sheet to which the pattern forming sheet is bonded is provided with a positioning reference hole. For this reason, even if the pattern forming sheet or the like is turned over, tolerances are not accumulated, and the alignment of a double-sided pattern can be performed easily and accurately.

In addition, since the alignment of a double-sided pattern can be performed easily and accurately, a precise circuit pattern can be shaped.

Second Example Embodiment

A pattern manufacturing apparatus according to the second example embodiment of the present invention will be described next with reference to FIGS. 8 and 9. FIG. 8 is a perspective view showing the overall arrangement of a pattern manufacturing apparatus 800 according to this example embodiment. The pattern manufacturing apparatus according to this example embodiment is different from that of the above-described first example embodiment in that a three-dimensional shaped object is shaped. The rest of the components and operations is the same as in the first example embodiment. Hence, the same reference numerals denote the same components and operations, and a detailed description thereof will be omitted.

The pattern manufacturing apparatus 800 includes a resin tank 801. A resin 811 that is the material of a three-dimensional shaped object or the like is put in the resin tank 801. The resin tank 801 is attached to a shaping base 101 of the pattern manufacturing apparatus 800 by attaching jigs 802. Since the resin tank 801 is a shallow box-shaped container made of a transparent material, the remaining amount of the resin 811 put in the resin tank 801 can easily be confirmed. The size of the resin tank 801 is, for example, 195 mm×185 mm×45 mm.

Figure 9:
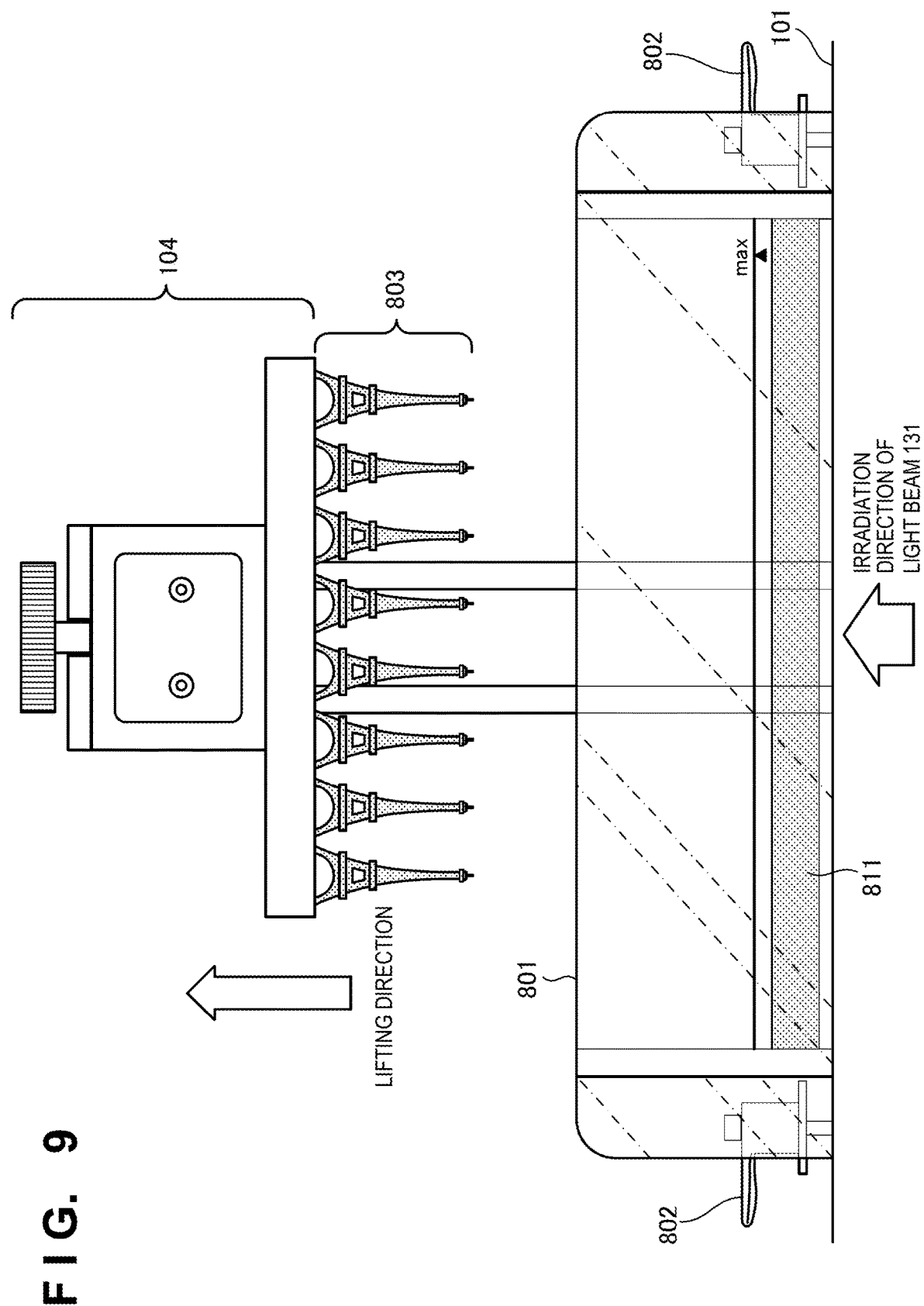
FIG. 9 is a view for explaining the manufacture of a three-dimensional shaped object by the pattern manufacturing apparatus according to the second example embodiment of the present invention.

FIG. 9 is a view for explaining the manufacture of a three-dimensional shaped object 803 by the pattern manufacturing apparatus 800 according to this example embodiment. The manufacture of the three-dimensional shaped object 803 is performed by causing an optical engine 103 to emit a light beam 131 toward the resin tank 801 and lifting a lifting head 104 in a lifting direction. The lifting speed of the lifting head 104 is appropriately decided based on the wavelength or intensity of the light beam 131 or the type of the material.

As shown in FIG. 9, according to the pattern manufacturing apparatus 800, a number of three-dimensional shaped objects 803 can be manufactured. Additionally, according to the pattern manufacturing apparatus 800, the precise three-dimensional shaped object 803 can be manufactured. Note that the size of the lifting head 104 to shape the three-dimensional shaped object 803 is, for example, 140 mm×80 mm.

According to this example embodiment, in addition to the circuit pattern described in the first example embodiment, a three-dimensional shaped object can be manufactured by the same apparatus. In addition, it is possible to obtain almost the same shaping accuracy as that of an injection molding machine and manufacture a precise circuit pattern. Furthermore, a number of three-dimensional shaped objects can be manufactured simultaneously.

Other Example Embodiments

While the present invention has been described with reference to example embodiments, it is to be understood that the invention is not limited to the disclosed example embodiments. The scope of the following claims is to be accorded the broadest interpretation so as to encompass all such modifications and equivalent structures and functions.

The present invention is applicable to a system including a plurality of devices or a single apparatus. The present invention is also applicable even when an information processing program for implementing the functions of the example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

What is claimed is:

1. A pattern-formed sheet comprising: a pattern forming sheet and a first pattern formed on a first surface of the pattern forming sheet and a second pattern formed on a second surface thereof,
    wherein the pattern is formed of an admixture comprising:
        a conductive material; and a photo-curing resin, applied onto the first surface and the second surface of the pattern forming sheet,
    wherein at least one positioning reference hole is formed in the pattern forming sheet so as to align the first pattern and the second pattern.

2. The pattern-formed sheet according to claim 1,
    wherein the pattern forming sheet has a rectangular shape, and the positioning reference hole is formed near a center of and on each side of the pattern forming sheet.

3. The pattern-formed sheet according to claim 2, wherein the pattern forming sheet further comprises at least one rotation preventing hole that prevents the pattern forming sheet from rotating.

4. The pattern-formed sheet according to claim 3, wherein the rotation preventing hole is formed near each of four corners of the pattern forming sheet.

5. The pattern-formed sheet according to claim 1,
wherein the pattern forming sheet has a rectangular shape, and
the at least one positioning reference hole is formed near each of four corners of the pattern forming sheet.

6. The pattern-formed sheet according to claim 1, wherein said positioning reference hole includes a substantially circular shape.

7. The pattern-formed sheet according to claim 1, wherein the pattern forming sheet further has at least one rotation preventing hole that prevents the pattern forming sheet from rotating.

8. The pattern-formed sheet according to claim 7, wherein the at least one rotation preventing hole is formed near each of four corners of the pattern forming sheet.

9. The pattern-formed sheet according to claim 7, wherein the rotation preventing hole has a substantially elliptical shape.

10. The pattern-formed sheet according to claim 1, wherein the pattern-formed sheet further comprises at least one stopper that prevents the pattern forming sheet from rotating.

11. The pattern-formed sheet according to claim 10, wherein the at least one stopper is formed at at least one of four corners of the pattern forming sheet.

12. A pattern manufacturing apparatus for forming the first pattern and the second pattern on the pattern forming sheet according to claim 1, comprising:
a first pin that is configured to be fitted in the positioning reference hole provided in the pattern forming sheet of claim 1; and
a forming unit that forms the pattern by irradiating the pattern forming sheet with a light beam.

13. The apparatus according to claim 12, further comprising a second pin that is configured to be fitted in a rotation preventing hole provided in the pattern forming sheet of claims.

14. The apparatus according to claim 13,
wherein the first pin has a substantially circular shape, and the second pin has a substantially rhombic shape, and
a length of a major axis of said second pin substantially matches a length of a major axis of the rotation preventing hole.

15. The apparatus according to claim 12, wherein the first pin is configured to be fitted in a positioning hole formed in a reference chart with which calibration of an irradiation position of the light beam is performed.

16. The pattern-formed sheet according to claim 1, wherein a shift between a position of the first pattern and a position of the second pattern is within a range of 50 µm or less.

17. A pattern manufacturing method by using a pattern manufacturing apparatus, wherein the pattern manufacturing apparatus comprises:
a forming unit that forms a pattern by irradiating a pattern forming sheet with a light beam; and
a first pin that is configured to be fitted in a positioning reference hole formed in the pattern forming sheet, the method comprising:
placing the pattern forming sheet in the pattern manufacturing apparatus, and aligning the pattern forming sheet by fitting the first pin into the positioning reference hole of the pattern forming sheet;
irradiating a first surface of the pattern forming sheet with the light beam so as to form a first pattern on a first surface of the pattern forming sheet;
turning over the pattern forming sheet;
placing the turned pattern forming sheet in the pattern manufacturing apparatus, and aligning the pattern forming sheet by fitting the first pin into the positioning reference hole of the pattern forming sheet; and
irradiating a second surface of the pattern forming sheet with the light beam so as to form the second pattern on the second surface of the pattern forming sheet, so that the first pattern on the first surface of the pattern forming sheet and the second pattern thereof are aligned.

* * * * *